J. Agate,
Beer Cooler.
Nº 79,931, Patented July 14, 1868

Witnesses:
Inventor:
John Agate

United States Patent Office.

JOHN AGATE, OF PITTSFORD, NEW YORK.

Letters Patent No. 79,931, dated July 14, 1868.

IMPROVED BEER-COOLER.

*The Schedule referred to in these Letters Patent and making part of the same.*

TO ALL WHOM IT MAY CONCERN:

Be it known that I, JOHN AGATE, of Pittsford, in the State of New York, have invented a new and useful Beer-Cooler; and I do hereby declare that the following is a full, clear, and exact description thereof, reference being had to the accompanying drawing, making part of this specification, in which—

Like letters of reference indicate corresponding parts in all the figures.

The nature of this invention will be understood from the drawings and specifications.

To enable others skilled in the art to make and use my invention, I will describe its construction and operation.

Figure 1:
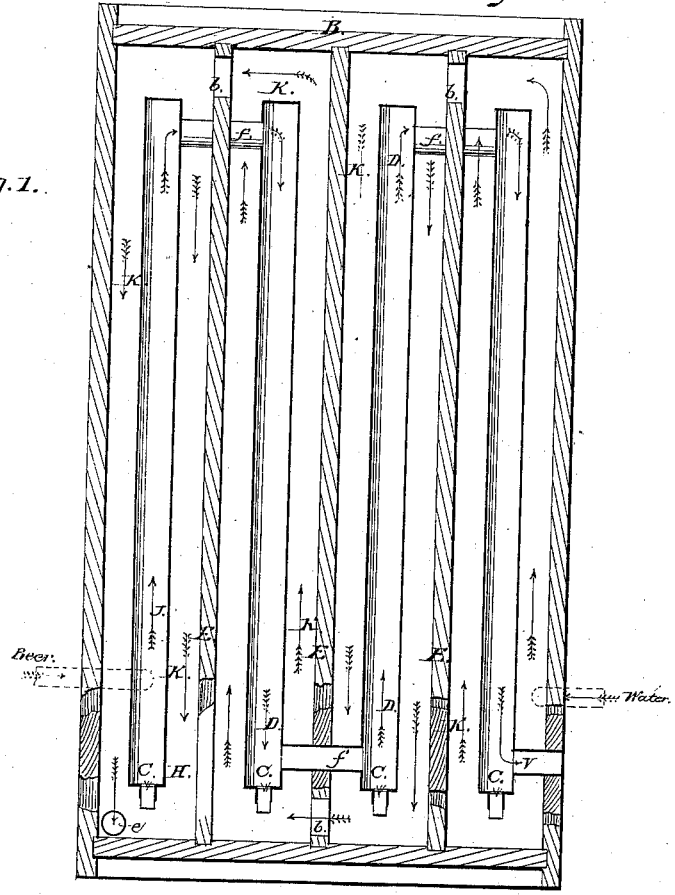
Figure 1 is a top view, showing one end broken away.
Figure 2:
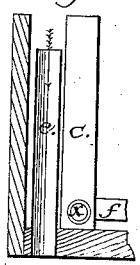
Figure 2 is a vertical section of one corner of the cooler, showing the water-discharge pipe.

My beer-cooler is composed of a wood box, B. This box may either be round or square. It is divided into several apartments, H, by partitions E. In the alternate end of each partition E, in the upper edge, a small notch, $b$, is formed, so that the water will flow from one chamber into another. In the corner of the box B, opposite to where the water enters it, I place a discharge-pipe, $e$, the top of which is below the top of the box, as shown in fig. 2, so that the water will discharge before it flows over it. In each apartment of the box B, an open metal tank, C, is placed, through which the beer flows. The tanks are joined together at each alternate end by a pipe, $f$. This pipe is placed at or near the bottom, and forms a continuous connection from one end to the other of the several tanks C. At the end of the tank C, opposite to the water-discharge pipe, $e$, I fasten a discharge-pipe, $v$, extending to the outside of the box B. In the end of each metal tank, a hole, $x$, is made, and fitted with a plug, which is removed when it is desirable to clean the tanks.

The object of this invention is to make a cheap beer-cooler, that can be used in a small or large brewery. The coolers at present in the market being expensive, small operators are debarred using the best means of cooling; whereas my device, I find by experience, is as effectual for the purpose, and they can be made at a trifling cost.

The operation is as follows: The beer is poured into the metal tanks C, on the side opposite the pipe $v$, and flows in the direction shown by the arrows J, and passes through each tank, by means of the connecting-pipes $f$, until it discharges through the pipe $v$. The water at the same time is poured into the apartment H, on the side opposite the tank in which the beer enters, and flows in the direction as shown by the arrows K, and passes over the different partitions, through the notches $b$, to the exit-pipe $e$, thus keeping up a continuous flow of water through the apartments and alongside of the beer-tanks. By this means the beer is cooled by the time it reaches the discharge-pipe $v$. The water entering on the opposite side to which the beer enters, and flowing in the opposite direction, and the beer being discharged from the tank C, at the point where the water is coldest, it is brought to a proper temperature before it leaves the cooler. The connecting-pipe $f$ being placed at or near the bottom of the tanks, all the beer is kept in motion, and it is brought in contact with the cooling action of the water. The beer, as it passes from one tank to the other, is drawn down to the bottom of the tank, where the water is coldest, by placing the connecting-pipes $f$ at or near the bottom.

What I claim as my invention, and desire to secure by Letters Patent, is—

Box B, divided into several compartments H, in combination with the tanks C, and connecting-pipes $f$, operating conjointly, substantially as and for the purposes shown and described.

JOHN AGATE.

Witnesses:
JAS. L. GAGE,
GEO. A. GAGE.